X0009593
Moody & Eastman,
Bed Bottom,
Patented Apr. 13, 1836.
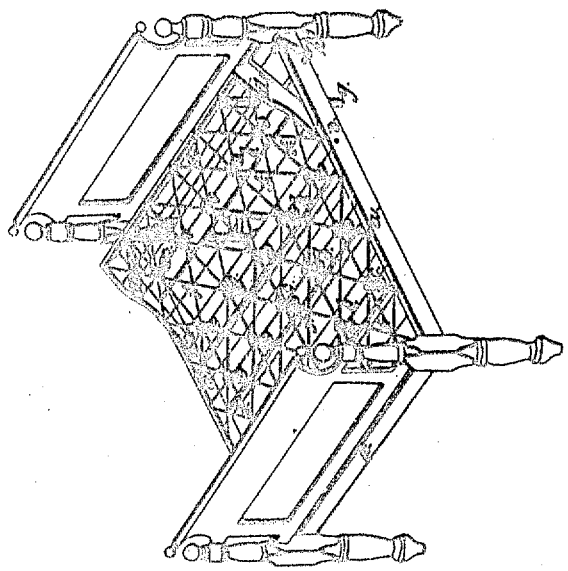
Witnesses.
Henry Kirkland
Thos. Mills Jr.
Inventor.
Moses T. Moody
Benjamin Eastman
U. PATENT OFFICE. PHOTO-LITHOGRAPHIC, WASHINGTON, D. C.

The Schedule referred to in these Letters Patent, and making part of the same, containing a description in the words of the said M. Brooke Buckley, himself, of his Improvement in heating Reverberatory or Puddling Furnaces with anthricite coal.

To all to whom these Presents shall come

Be it known, that I, M. Brooke Buckley of the Borrough of Pottsville, in the County of Shuylkill, and State of Pennsylvania, have invented or discovered a new & useful improvement in heating Reverberatory or Puddling Furnaces, with Anthracite Coal, and the following is a full & exact descrip-tion thereof. The common and only mode now in use, of heating Reverberatory or Puddling Furnaces, is by the flame of bituminous Coal created by the draft of high stacks of Chimneys. The coal is placed upon a Grate, the air passing freely under it, is sufficient, for the use of bituminous Coal. In my discovery or invention, I use the anthracite Coal placed in a cylinder or Chamber, the size of which must be in proportion to the size of your furnace; for common uses two feet in diameter by three feet high is sufficient, but may be made any convenient size or shape to suit the Furnace. I substitute a blast created by a common blowing apparatus to the Coal, contained in the Cylinder or Chamber made of fire clay or Brick, or of any sufficient fire proof ma-terial. the blast is introduced into it, by a pipe at or near the bottom of the Chamber, and thereby expels a powerful flame, which passes into the furnace & creates the necessary heat for all the variety of uses for which the Reverberatory Furnaces <u>is</u> now, or may be used. The impurities of the Coal <u>is</u> passed off in a fluid state by a Cinder hole near the bottom of the Coal Chamber, and the fire is kept free & open by the blast. The use of the anthracite Coal is much more econo-mical, and certain in its application, than the bituminous, and will prove to be an immense saving in the process of refining & manufacture of iron and will go far towards placing the United States upon an equality with Europe in that species of manufacture

What I claim as my invention & improvement, is the introduction of

985938X application of anthracite Coal to the Reverberatory or Pudding Furnace by means of Blast to expel the flame & heat therefrom, instead of the draught created by the high stacks or chimneys now in use for the bituminous Coal.

The accompanying drawings represents the Furnace with my invention and improvement. It is constructed with common Brick lined with Fire-brick, and arched, and bound together by cast-Iron plates & bars.

N. Brooke Buckley

Witnesses
S. Macdonald
Wm F. Stiegler

Drawing Made

Exd W.G.C.

[Drawing in 75, Metallurgy Puddling furnaces, Feb. 11/89.]

(504 words)